(12) United States Patent
Qiang et al.

(10) Patent No.: US 9,560,528 B2
(45) Date of Patent: Jan. 31, 2017

(54) ASSIGNING FREQUENCY BANDS FROM A GROUP OF FREQUENCY BANDS TO A WIRELESS NETWORK SYSTEM

(75) Inventors: Jianfeng Qiang, Beijing (CN); Yong Teng, Beijing (CN); Jiezhen Lin, Beijing (CN)

(73) Assignee: Nokia Solutions And Networks OY, Espoo (FI)

( * ) Notice: Subject to any disclaimer, the term of this patent is extended or adjusted under 35 U.S.C. 154(b) by 103 days.

(21) Appl. No.: 14/366,392

(22) PCT Filed: Dec. 22, 2011

(86) PCT No.: PCT/CN2011/084473
§ 371 (c)(1),
(2), (4) Date: Jun. 18, 2014

(87) PCT Pub. No.: WO2013/091225
PCT Pub. Date: Jun. 27, 2013

(65) Prior Publication Data
US 2014/0328311 A1    Nov. 6, 2014

(51) Int. Cl.
*H04W 4/00* (2009.01)
*H04W 16/14* (2009.01)
*H04W 72/08* (2009.01)

(52) U.S. Cl.
CPC ........... *H04W 16/14* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 2003/0210665 A1 | 11/2003 | Salmenkaita et al. | |
| 2010/0034108 A1* | 2/2010 | Ode | H04W 72/085 370/252 |
| 2011/0014936 A1* | 1/2011 | Kim | H04W 24/10 455/509 |
| 2011/0170453 A1 | 7/2011 | Babbar | |
| 2011/0280258 A1 | 11/2011 | Klingen | |

(Continued)

FOREIGN PATENT DOCUMENTS

| | | |
|---|---|---|
| CN | 1471329 A | 1/2004 |
| CN | 101527915 A | 9/2009 |

(Continued)

OTHER PUBLICATIONS

European Supplementary Search Report for European Application No. 11877923.0, mailed Nov. 27, 2015, 8 pages.

(Continued)

*Primary Examiner* — Minh-Trang Nguyen
(74) *Attorney, Agent, or Firm* — Brake Hughes Bellermann LLP

(57) ABSTRACT

A method for assigning frequency bands from a group of frequency bands, the method comprising determining a quality of service being required by the wireless network system, comparing the required quality of service with the predefined categories of the plurality of groups of frequency bands, selecting a group of frequency bands based on the comparison, and assigning at least one band from the selected group of frequency bands to the wireless network system, for communication between the at least one base station and the at least one user equipment.

20 Claims, 2 Drawing Sheets

(56) References Cited

U.S. PATENT DOCUMENTS

2012/0140658 A1* 6/2012 Kanzaki ............... H04B 7/0426
370/252

FOREIGN PATENT DOCUMENTS

CN 101873624 A 10/2010
EP 1641308 B1 5/2008

OTHER PUBLICATIONS

Pier Luigi Parcu et. al.: "Authorised Shared Access (ASA): An innovative model of pro-competitive spectrum management", May 1, 2011 (May 1, 2011), pp. 1-43 the whole document.
International Search Report and Written Opinion for International Application No. PCT/CN2011/084473, mailed Oct. 4, 2012, 10 pages.

* cited by examiner

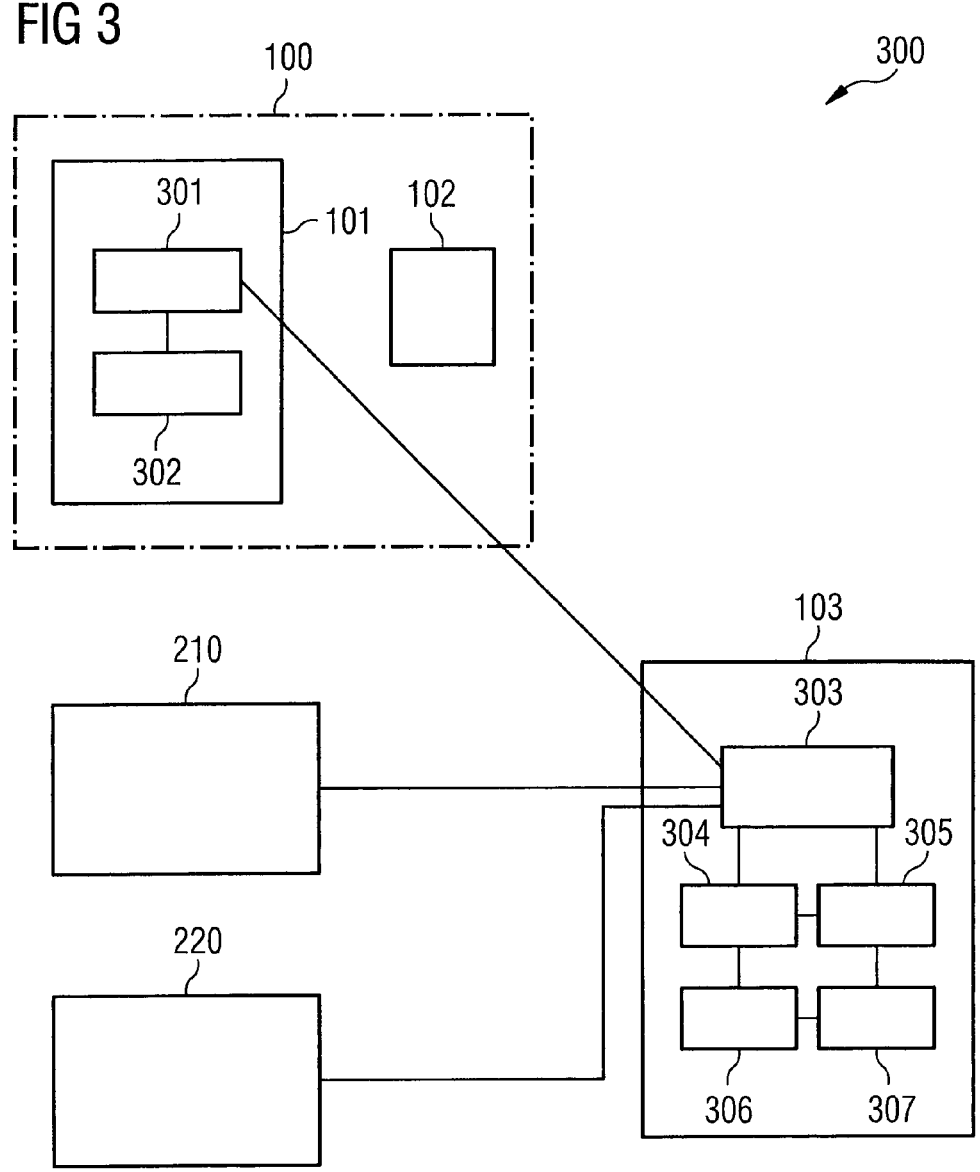

ASSIGNING FREQUENCY BANDS FROM A GROUP OF FREQUENCY BANDS TO A WIRELESS NETWORK SYSTEM

FIELD OF INVENTION

The present invention relates to the field of wireless communication systems and in particular to wireless communication systems with network devices supporting cognitive radio.

ART BACKGROUND

In wireless communication networks, a frequency spectrum may be shared between different network devices. The network devices may be in particular devices with cognitive radio function. Such a device may be a device that automatically changes its transmission or reception parameters, in a way in that the entire wireless communication network communicates efficiently, while avoiding interference with licensed or licensed exempt users. This alteration of parameters is based on the active monitoring of several factors in the external and internal radio environment, such as radio frequency spectrum, user behavior and network state.

In such wireless communication systems, for example with 3GPP LTE-advanced devices with cognitive radio function, the frequency spectrum, or moreover frequency bands of the spectrum may be licensed according to a license scheme. In particular, the scheme may be related to a service (QoS, quality of service) guarantee scheme, as provided by the Authorised Shared Access (ASA) concept in cognitive radio technology. The Authorized Shared Access (ASA) is a complementary spectrum authorization scheme for commercial use that may enable timely availability of harmonized spectrum for mobile broadband while ensuring predictable QoS for all rights holders. ASA may allow new users to access to an already licensed spectrum with the obligation to protect the incumbent user. For example it may an IMT service to access the bands that are under-utilised by existing primary uses, especially to bands that have been allocated to mobile but not made available for mobile use through current regulatory means. The access may be regulated via cognitive radio capabilities, i.e. geolocation databases complemented, if required, by sensing. ASA is neither exclusive licensing nor license-exempt but has few commonalties with licensing-light. The incumbent user works on a primary basis maintaining its spectrum assignment over time in line with the National Table of Frequency Allocation. ASA allows selected authorised users to share the ASA band under some technical condition. Predictable QoS can be ensured for those limited number of non-overlapping authorised users.

The actual ASA concept is a framework to share a spectrum between limited numbers of authorized users. Under this concept, the initial user(s) (e.g. the "incumbent(s)") would share its spectrum with one or several new users (the "incoming user(s)") in accordance with a set of conditions defined by the regulation. These conditions may be "static" (e.g. exclusion zone, restricted time for operation) or more 'dynamic' (e.g. geographic/time sharing, on-demand authorization of operators).

However, there may be a need for an improved system and method being able to ensure a predictable quality of service (QoS) for all spectrum users.

SUMMARY OF THE INVENTION

This need may be met by the subject matter according to the independent claims. Advantageous embodiments of the present invention are described by the dependent claims.

According to a first aspect of the invention there is provided a method for assigning frequency bands from a group of frequency bands to a wireless network system, for communications between at least one base station and at least one user equipment, wherein a frequency spectrum comprising a plurality of frequency bands is available to a plurality of wireless network systems, wherein the plurality of frequency bands is partitioned into a plurality of groups of frequency bands (also referred to as "band group"), wherein a predefined category is associated with each of the plurality of groups of frequency bands (also referred to as "band group's category"), wherein each predefined category is indicative for an available quality of service within the associated group of frequency bands (also referred to as "category of usability"). The method comprises determining a quality of service being required by the wireless network system, comparing the required quality of service with the predefined categories of the plurality of groups of frequency bands, selecting a group of frequency bands based on the comparison, and assigning at least one band from the selected group of frequency bands to the wireless network system, for communication between the at least one base station and the at least one user equipment.

This aspect of the invention is based on the idea to ensure a predictable quality of service (QoS) for all spectrum users by grouping frequency bands into groups providing a specific QoS and assigning wireless network systems requiring a specific QoS to the appropriate group. Based on this idea, frequency bands are shared by wireless network systems needing the same QoS.

The invention relates to wireless communication systems, comprising for instance 3GPP LTE-advanced devices with cognitive radio function, and future frequency band license scheme. In particular, the scheme is related to the service QoS guarantee scheme in the new Authorised Shared Access (ASA) concept in cognitive radio technology.

As explained above, the Authorized Shared Access (ASA) is a complementary spectrum authorization scheme for commercial use that may enable timely availability of a harmonized spectrum for mobile broadband while ensuring predictable QoS for all rights holders. ASA allows new users access to an already licensed spectrum with the obligation to protect the incumbent user, i.e. the already existing user. It may further allow for example IMT (LTE or UMTS based) services to access the bands that are under-utilised by existing primary uses, especially to bands that have been allocated to mobile but not made available for mobile use through current regulatory means. The access may be via cognitive radio capabilities, i.e. geo-location databases complemented, if required, by sensing. The ASA approach is neither exclusive licensing nor license-exempt but has few commonalties with licensing-light. The incumbent user may work on a primary basis maintaining its spectrum assignment over time in line with the National Table of Frequency Allocation. ASA may allow selected authorised users to share the ASA band under some technical condition. Predictable QoS can be ensured for those limited number of non-overlapping authorised users.

The above mentioned dynamic implementation of the ASA concept may take advantages of the recent advances in cognitive technology allowing sharing spectrum in a more dynamic way including on a frequency, location and time sharing basis. In other words, protecting of primary user does not mean lack of certainty and service QoS guarantee for the incoming users.

The described method according to the invention may improve the guarantee of QoS by granting an ASA band (group of frequency bands) to a certain ASA user based on the QoS requirements of the user.

The term "user" in this context may denote a spectrum user, typically a wireless network (system).

When, for instance, a user may need some VoIP service and thus has to make use of an ASA band, the base station may find (based on the predefined category) a proper ASA band group, i.e. group of frequency bands, to carry the ASA user according to the QoS provided by the selected group of frequencies and an ASA user QoS matching result (of the comparison).

The described method may provide some advantages. This scheme may ensure a reliable grant procedure and predictable QoS for all (incumbent and ASA) users. As users requiring a lower QoS may be assigned to frequency bands providing a lower QoS, other frequency bands providing a higher QoS may be still available, i.e. unused or free, for users requiring a higher QoS. The method may further provide a good flexibility and scalability based on the band group and user group scheme. It may be flexible to introduce new ASA band or new ASA user in each group, or flexible to change the attribute, i.e. group and associated category, of the ASA band and an ASA user dynamically, any may efficiently make use of band resources.

The terms "ASA user" and "ASA band" may refer to a wireless network system used according to the ASA scheme and a frequency band used according to the ASA scheme.

The term "predefined category" in this context may denote an indicator for a QoS which may be provided when using the specific group of frequency bands.

The term "base station" in this context may denote any kind of physical entity being able to hold one or more cells. A base station in this context may be any kind of network device providing the required functionality for the method. It may also be a transceiver node in communication with a centralized entity. The base station may be for example an eNodeB or eNB. In particular, such a base station may support cognitive radio functions.

The term "cognitive radio" may refer to a function of a device that automatically changes its transmission or reception parameters, in a way in that the entire wireless communication network communicates efficiently, while avoiding interference with licensed or licensed exempt users.

According to a further embodiment of the invention, the method further comprises determining a quality of service being required by a further wireless network system, comparing the required quality of service with the predefined categories of the plurality of groups of frequency bands, selecting a group of frequency bands based on the comparison, and assigning at least one band of the selected group of frequency bands to the further wireless network system, for communications between at least one further base station and at least one further user equipment.

According to this embodiment, wireless network systems providing communications between a plurality of users with several base stations may be assigned to one or different frequency bands.

According to a further embodiment of the invention, wireless network systems requiring a similar quality of service are assigned to a similar category of group of frequency bands.

According to this embodiment, wireless network systems requiring similar QoS may communicate within the same or a similar QoS category of ASA bands. Thus, frequency bands being associated with high QoS may be kept free for users requiring high QoS, wherein frequency bands being associated with lower QoS may be used by users requiring lower QoS.

According to a further embodiment of the invention, a group of frequency bands comprises at least one frequency band.

A group may consist of one or more frequency bands. One frequency band may comprise one or more frequencies. The frequency bands within one group may be adjacent but do not have to be adjacent to each other.

According to a further embodiment of the invention, the method further comprises determining an available quality of service (also referred to as "band usability property") for each of the plurality of frequency bands, partitioning the plurality of frequency bands into a plurality of groups of frequency bands based on the determined quality of service, and associating a category with each of the plurality of groups frequency bands, wherein a category is indicative for an available quality of service within the associated group of frequency bands.

Before assigning users to different groups of frequency bands, the frequency spectrum may be partitioned. This partitioning may be performed by the base station or by a central control unit, like an operation and maintenance system.

According to a further embodiment of the invention, the method further comprises adapting the category for each of the plurality of groups of frequency bands by adapting the quality of service for each of the plurality of frequency bands and re-partitioning the plurality of frequency bands into a plurality of groups of frequency bands based on the adapted quality of service, in particular in dynamic time.

This may provide the advantage to adapt the categorization of the frequency spectrum according to changes of the spectrum, for instance, change of network structure. According to this embodiment, a dynamic sharing between frequencies may be provided.

According to a further embodiment of the invention, the method further comprises detecting an actual load of the plurality of groups of frequency bands, and selecting a group of frequency bands based on the comparison and the actual load.

Assigning the network system to a group of frequency bands may in addition be based on an actual load of groups. When one group would be selected based on a category and QoS of the user, but this group is already overloaded, a different group providing a similar or identical QoS may be selected.

According to a further embodiment of the invention, the method further comprises exchanging a signal between the wireless network system, in particular the base station of the wireless network system, and a further wireless network system, in particular a base station of the further wireless network system, wherein the signal comprises information of the plurality of groups and the category associated with each group.

Wireless network systems, in particular via their base stations, may share the partitioning of the frequency spectrum. Based on this, the same partitioning and association of frequencies to QoS may be used by all network devices (base stations, UEs, . . . ) in the wireless network system.

According to a further embodiment of the invention, the plurality of groups and the category associated with each group is stored in a central control unit.

When, for instance, a user may need a specific QoS, the band administrator may retrieve a band resource database and find a proper ASA band to carry the ASA user according to the requirements. Such a database may be located in a central control unit like an operation and maintenance (O&M) system.

According to a further embodiment of the invention, the frequency spectrum is shared between wireless network systems according to the authorised shared access scheme.

This scheme, as explained above, may be used to provide a shared access to frequencies within a plurality of wireless network systems. Some of the users may already be assigned to frequencies, and new users may wish to access the frequency. In this case, according the described method, QoS requirements of the existing users may be maintained and QoS of new spectrum users may be fulfilled.

According to a second aspect of the invention, there is provided a network unit being connectable to a wireless network system for assigning frequency bands from a group of frequency bands to the wireless network system for communications within the wireless network system between at least one base station and at least one user equipment, wherein a frequency spectrum comprising a plurality of frequency bands is available for a plurality of wireless network systems for communications, wherein the plurality of frequency bands is partitioned into a plurality of groups of frequency bands, wherein a predefined category is associated with each of the plurality of groups of frequency bands, wherein each predefined category is indicative for an available quality of service within the associated group of frequency bands. The network unit comprises a determination unit being adapted to determine a quality of service being required by the wireless network system, a comparison unit being adapted to compare the required quality of service with the predefined categories of the plurality of groups of frequency bands, a selection unit being adapted to select a group of frequency bands based on the comparison, and an assignation unit being adapted to assign the selected group of frequency bands to the wireless network system, for communication between the at least one base station and the at least one user equipment.

The network unit may be any type of control unit, which is capable of controlling a frequency spectrum used in a wireless network system. Thereby, the network unit may be connectable to the wireless network system and may be adapted to communicate with the wireless network system via its base station or with any other network element. The network unit may be in particular a central control unit, like an O&M system unit.

The network unit may comprise a receiving unit, for example a receiver as known by a skilled person. The network unit may also comprise a transmitting or sending unit, for example a transmitter. The receiver and the transmitter may be implemented as one single unit, for example as a transceiver. The transceiver or the receiving unit and the sending unit may be adapted to communicate with the base station and any other network element of the wireless network system, for instance via an antenna.

The determination unit, the comparison unit, the selection unit and the assignation unit may be implemented as single units or may be implemented for example as part of a standard control unit, like a CPU or a microcontroller. These units may be coupled with the transceiver.

The wireless network system may be any kind of wireless network system being operated according to the authorized shared access technology. The network unit may determine QoS requirements of the network system and may select frequency groups for communication within the network system based on this QoS requirement.

The base station may be any type of access point or point of attachment, which is capable of providing a wireless access to a wireless network system. Thereby, the wireless access may be provided for a user equipment or for any other network element, which is capable of communicating in a wireless manner. The base station may be an eNodeB, eNB, home NodeB or HNB, or any other kind of access point. In particular, the base station may be a network device supporting cognitive radio functions.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna. The transceiver may also be adapted to communicate with the network unit.

The base station may further comprise a configuration unit for configuring a communication based on the assigned frequencies, which may be implemented as a single unit or may be implemented for example as part of a standard control unit, like a CPU or a microcontroller. The unit may be coupled with the transceiver.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

According to a third aspect of the invention, there is provided a wireless network system, the wireless network system comprises a network unit as described above.

Generally herein, the method and embodiments of the method according to the first aspect may include performing one or more functions described with regard to the second or third aspect or an embodiment thereof. Vice versa, the base station or wireless network system and embodiments thereof according to the second and third aspect may include units or devices for performing one or more functions described with regard to the first aspect or an embodiment thereof.

According to a fourth aspect of the herein disclosed subject-matter, a computer program for assigning frequency bands from a group of frequency bands to a wireless network system is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a wireless network system, a network unit and a method of assigning frequency bands from a group of frequency bands to a wireless network system. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

FIG. 3 shows a plurality of wireless network systems according to a further exemplary embodiment of the invention.

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE. However, such reference to current standards is only exemplary and should not be considered as limiting the scope of the claims.

Figure 1:
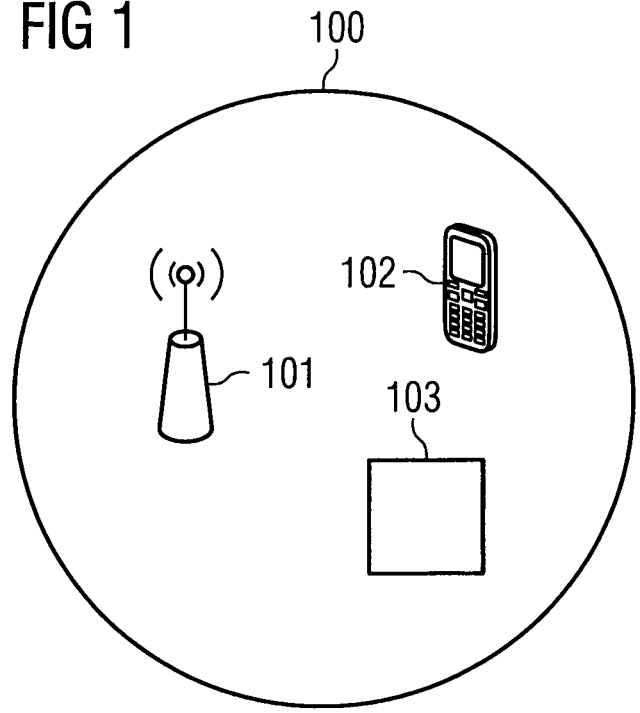
FIG. 1 shows a wireless network system according to an exemplary embodiment of the present invention.

FIG. 1 shows a wireless network system 100. A user equipment 102 within the wireless network system is served by a base station 101. The base station or eNB 101 and the user equipment or UE 102 are adapted to communicate with each other. A network unit 103 may be connected to the network system, for instance via the base station.

The network unit may determine QoS required by the wireless network system, for instance based on services provided for the user equipment, and may select a group of frequency bands providing the required QoS.

The frequency spectrum of the wireless network system comprises a plurality of frequency bands. The plurality of frequency bands is partitioned into a plurality of groups of frequency bands, wherein a predefined category is associated with each of the plurality of groups of frequency bands. Each predefined category is indicative for an available quality of service within the associated group of frequency bands. The partitioning of the frequency bands as well as assigning categories to each group may be performed for instance in a central control unit.

The network unit may compare the quality of service required by the wireless network system, or user, with the predefined categories of the plurality of groups of frequency bands and may select a group of frequency bands based on this comparison. Subsequently, the network unit can then assign the selected group of frequency bands to the communication within the wireless network system and thus also to the communication between the base station 101 and the user equipment 102.

This method and system relates to wireless communication systems with, for instance 3GPP LTE-advanced devices with cognitive radio function, and future frequency band license schemes. In particular, the method is related to the service QoS guarantee scheme in the new Authorised Shared Access (ASA) concept in cognitive radio technology.

The Authorized Shared Access (ASA) is a complementary spectrum authorization scheme for commercial use that should enable timely availability of harmonized spectrum for mobile broadband while ensuring predictable QoS for all rights holders. ASA allows new users access to an already licensed spectrum with the obligation to protect the incumbent user, for example, allows IMT services (for example UMTS) to access the bands that are under-utilised by existing primary users, especially to bands that have been allocated to mobile but not made available for mobile use through current regulatory means. The access may be via cognitive radio capabilities, i.e. geo-location databases complemented, if required, by sensing. The incumbent user works on a primary basis maintaining its spectrum assignment over time in line with the National Table of Frequency Allocation. ASA may allow selected authorised users sharing the ASA band under some technical condition. Predictable QoS can be ensured for those limited number of non-overlapping authorised users.

The dynamic implementation of the ASA concept according to embodiments of the invention may take advantages of the recent advances in cognitive technology allowing sharing spectrum in a more dynamic way including on a frequency, location and time sharing basis. In other words, protecting of primary user does not mean lack of certainty and service QoS guarantee for the incoming users.

The ASA concept is a framework to share spectrum between limited numbers of authorized users. Under this concept, the initial user(s) (e.g. the "incumbent(s)") would share its spectrum (the ASA spectrum) with one or several new users (the "incoming user(s)") in accordance with a set of conditions defined by the regulation. These conditions may be "static" (e.g. exclusion zone, restricted time for operation) or more 'dynamic' (e.g. geographic/time sharing, on-demand authorization of operators). One of the key challenges of ASA concept is to ensure a predictable quality of service (QoS) for all spectrum users. The objective is to achieve predictable, controllable QoS in typical scenarios. From the practical operators' point, QoS capability provided by the ASA band is very important. Another challenge is a lacking scheme to provide proper prioritization between the ASA users at the same ASA band during licensing procedure.

The ASA concept highlights service QoS guarantee requirement, which is attractive to wireless service users/operators, while the detailed solution is not discussed publicly, and specifically, the schemes relevant with the spectrum granting to an ASA user are not available yet. The researchers and regulators are looking for proper bands, spectrum regulation policy, and system control scheme to fulfill the above challenges.

The method and system (also referred to as scheme in the following) as described in the context of the Figures introduces a novel scheme to guarantee the ASA users' QoS requirements, via mapping with an ASA band usability attribute.

In the scheme, all the possible ASA bands are categorized by a band usability category in certain geographic area. The band usability category may include the attributes of frequency resource, available time frame, available place, QoS (assumed data throughput, delay, jitter) etc. Each ASA band group can include one or more bands with similar QoS availability, which is flagged with an ASA band usability category ID.

For instance, some ASA bands may have a good coverage and may be reliably available in a long time window like days, weeks etc. Other bands in different group may provide a hot spot coverage, shared with uncertain incumbent user from time to time. The service QoS stability may be limited in the latter case.

On the other hand, ASA users are grouped by the QoS requirement category, according to this scheme. Naturally, not all the users are with the highest or lowest QoS requirement. Similarly, each ASA user group may include one or more users with similar QoS requirements, which is flagged with an ASA user QoS requirement category ID.

ASA band usability category: ASA bands may be categorized by an ASA band usability attribute, indexed by a category ID. The bands with the same category ID may have a similar usability attribute and can backup with each other. Typical ASA band usability category attributes may take into account the frequency band, bandwidth of the band, incumbent service, coverage geo-location ID, due time frame/availability, upper limit number of authorized users, band rank, legacy QoS parameters, etc. Moreover, a QoS class/subclass of an ASA band may be possibly defined in the same ASA band group. For a band rank, i.e., 700 MHz band, may be a high band rank due to good propagation property and an incumbent service occupation may be stable for an available time frame on the band.

The ASA band usability attribute definition could be dynamic on the same band. In other words, the band could be in one QoS category this time, be in another QoS category when the condition changes, and it may only reflect the current channel usability status, with considerations on both the incumbent user as well as the accessed new comer users.

ASA user QoS category: This may refer to indexing the QoS requirement of an ASA user. The category can take into account a user priority (primary, co-primary, or priority by number), ASA user scheduled/expected time window, category of ASA user QoS requirement, etc. Several ASA users can have the same category id, etc. The QoS requirements can be updated as well.

According to the above parameters, each ASA user may find its proper ASA band category according to the QoS class matching scheme. So, an efficient use of band resources can be provided by putting different user groups on different ASA bands.

For instance, the IMT service could be categorized by real time services, stream services, background services, etc. For instance, real time services and voice/video call might be put on a high category ASA band; low QoS data services, scheduled machine-to-machine communication, or non-critical service could be on a low category ASA band.

An example of an ASA band category group to ensure stable service QoS can be that two or more ASA bands with the same ASA band usability category are backup group members. If one ASA band isn't available, the ASA user can move to the ASA band in the same category.

One exemplary ASA band grant procedure may be as follows. An ASA band (group) is granted to a certain ASA user (group) based on a QoS requirement. When some VoIP service (one ASA user) has to make use of an ASA band, the band administrator retrieves the ASA band resource database, finds a proper ASA band (category) to carry the ASA user according to the target band QoS Category and ASA user QoS matching result. Then, user equipment, base station and the O&M database can finish the radio resource reconfiguration and facilitate the ASA band usage.

This may provide the following advantages. It may ensure a reliable grant procedure and predictable QoS for all (incumbent and ASA) users. A good flexibility and scalability by band group and user group scheme may be provided. It may be flexible to introduce new ASA bands or new ASA users in each group, or flexible to change attributes of an ASA band and an ASA user dynamically, efficiently making use of band resources. Each ASA user may just sense limited radio signals in the target band instead of an exhausted signal detection. Furthermore, measurement cost may be reduced and the sensing period may be speeded up.

Figure 2:
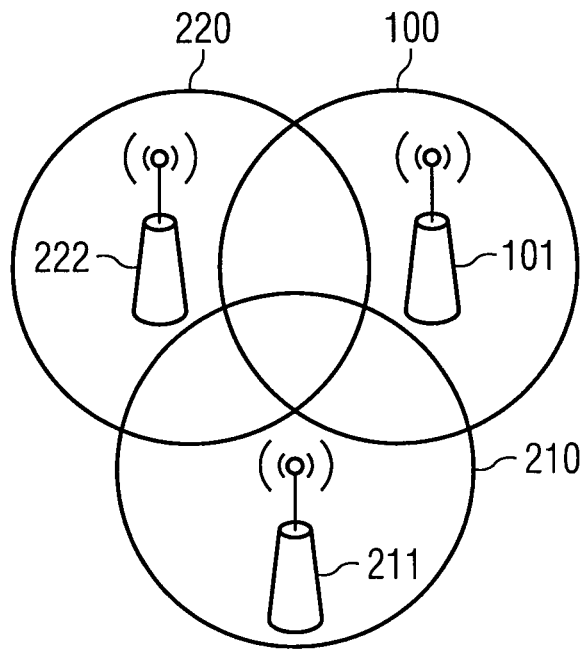
FIG. 2 shows a plurality of wireless network systems according to a further embodiment of the present invention.

FIG. 2 shows a plurality of wireless network systems 100, 210, 220 according to a further embodiment of the present invention, wherein the three network systems are sharing the frequency spectrum. Although shown as IMT or LTE cells with base stations 101, 211, 222, the network systems may be any kind of wireless network systems. One example for assigning frequency bands to the wireless network systems will be described in the context of FIG. 2.

The base station 101 has already assigned some frequency bands, i.e. a group of frequency bands to the first wireless network system 100. Now, a second wireless network system 210 requests a group of frequency bands for some services. A network unit, for instance a central control unit then determines a quality of service being required by the second wireless network system or user for the specific services, compares the required quality of service with the predefined categories of the plurality of groups of frequency bands, selects a group of frequency bands based on the comparison, and assigns the selected group of frequency bands to the communication within the network 210, i.e. for the communication between the base station 211 and a user equipment.

A third wireless network system 220, having a base station 222, also requests a group of frequency bands for some services. The network unit then determines a quality of service being required by the third user 220 for the specific services, compares the required quality of service with the predefined categories of the plurality of groups of frequency bands, selects a group of frequency bands based on the comparison, and assigns the selected group of frequency bands to the user 220.

The base stations may also exchange signals with a central control unit in order to receive information of the plurality of groups and the category associated with each group.

FIG. 3 shows the plurality 300 of wireless network systems according to a further exemplary embodiment of the invention. The wireless network system 100 comprises a base station 101 and a user equipment 102.

The base station may be any type of access point or point of attachment, which is capable of providing a wireless access to a wireless network system. Thereby, the wireless access may be provided for a user equipment or for any other network element, which is capable of communicating in a wireless manner. The base station may be an eNodeB, eNB, home NodeB or HNB, or any other kind of access point. In particular, the base station may be a network device supporting cognitive radio functions.

The base station 101 may comprise a receiving unit, for example a receiver as known by a skilled person. The base station may also comprise a transmitting or sending unit, for example a transmitter. The receiver and the transmitter may be implemented as one single unit, for example as a transceiver 301. The transceiver or the receiving unit and the sending unit may be adapted to communicate with the user equipment via an antenna.

The transceiver may also be adapted to communicate with the network unit 103, for instance a central control unit. The central control unit may be adapted to control the frequency allocation to the plurality of network systems 100, 210, 220.

The base station may comprise a configuration unit 302 for configuring the communication with the user equipment based on the allocated or assigned frequencies. The configuration unit may be implemented as a single unit or may be implemented for example as part of a standard control unit, like a CPU or a microcontroller. The unit may be coupled with the transceiver.

The network unit 103 may be any kind of network control unit being adapted to control the frequency allocation for a plurality of network systems. The network unit may be for instance a central control unit.

The network unit may comprise a receiving unit, for example a receiver as known by a skilled person. The network unit may also comprise a transmitting or sending unit, for example a transmitter. The receiver and the transmitter may be implemented as one single unit, for example as a transceiver 303. The transceiver or the receiving unit and the sending unit may be adapted to communicate with the network systems via their base stations.

The network unit comprises a determination unit 304 being adapted to determine a quality of service being required by the network system, a comparison unit 305 being adapted to compare the required quality of service with the predefined categories of the plurality of groups of frequency bands, a selection unit 306 being adapted to select a group of frequency bands based on the comparison, and an assignation unit 307 being adapted to assign the selected group of frequency bands to the communication within the network system 100, thus to a communication between the base station and the user equipment.

The determination unit, the comparison unit, the selection unit and the assignation unit may be implemented as single units or may be implemented for example as part of a standard control unit, like a CPU or a microcontroller. These units may be coupled with the transceiver.

The user equipment (UE) may be any type of communication end device, which is capable of connecting with the described base station. The UE 102 may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The wireless network systems 100, 210, 220 may share the available frequency spectrum according to the described method.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Wireless network system
101 Base station
102 User equipment
103 Network unit 210 Wireless network system
211 Base station
220 Wireless network system
222 Base station
300 Plurality of wireless network systems
301 Transceiver of base station
302 Configuration unit of base station
303 Transceiver of network unit
304 Determination unit of network unit
305 Comparison unit of network unit
306 Selection unit of network unit
307 Assignation unit of network unit

What is claimed is:

1. A method for assigning frequency bands from a group of frequency bands to a wireless network system for communications within the wireless network system between at least one base station and at least one user equipment, wherein a frequency spectrum comprising a plurality of frequency bands is available to a plurality of wireless network systems for communications, wherein the plurality of frequency bands is partitioned into a plurality of groups of frequency bands, wherein a predefined category is associated with each of the plurality of groups of frequency bands, wherein each predefined category is indicative for an available quality of service within the associated group of frequency bands, the method comprising:
   determining a quality of service being required by the wireless network system;
   comparing the required quality of service with the predefined categories of the plurality of groups of frequency bands;
   selecting a group of frequency bands based on the comparison; and
   assigning at least one band from the selected group of frequency bands to the wireless network system, for communication between the at least one base station and the at least one user equipment.

2. The method as set forth in claim 1, the method further comprising:
   determining a quality of service being required by a further wireless network system;
   comparing the required quality of service with the predefined categories of the plurality of groups of frequency bands;
   selecting a group of frequency bands based on the comparison; and
   assigning at least one band of the selected group of frequency bands to the wireless network system for communication between at least one further base station and at least one further user equipment.

3. The method as set forth in claim 2, wherein wireless network systems requiring a similar quality of service are assigned to a similar category of group of frequency bands.

4. The method as set forth in claim 1, wherein a group of frequency bands comprises at least one frequency band.

5. The method as set forth in claim 1, the method further comprising:
   determining an available quality of service for each of the plurality of frequency bands;
   partitioning the plurality of frequency bands into a plurality of groups of frequency bands based on the determined quality of service; and
   associating a category with each of the plurality of groups of frequency bands, wherein a category is indicative for an available quality of service within the associated group of frequency bands.

6. The method as set forth in claim 1, the method further comprising:
   adapting the category for each of the plurality of groups of frequency bands by:
      adapting the quality of service for each of the plurality of frequency bands; and
      re-partitioning the plurality of frequency bands into a plurality of groups of frequency bands based on the adapted quality of service.

7. The method as set forth in claim 1, the method further comprising:
   detecting an actual load of the plurality of groups of frequency bands; and
   selecting a group of frequency bands based on the comparison and the actual load.

8. The method as set forth in claim 1, the method further comprising exchanging a signal between the wireless network system and a further wireless network system, wherein the signal comprises information of the plurality of groups and the category associated with each group.

9. The method as set forth in claim 1, wherein the plurality of groups and the category associated with each group is stored in a central control unit.

10. The method as set forth in claim 1, wherein the frequency spectrum is shared between wireless network systems according to an authorized shared access scheme.

11. A network unit being connectable to a wireless network system, for assigning frequency bands from a group of frequency bands to the wireless network system for communications within the wireless network system between at least one base station and at least one user equipment, wherein a frequency spectrum comprising a plurality of frequency bands is available to a plurality of wireless network systems for communications, wherein the plurality of frequency bands is partitioned into a plurality of groups of frequency bands, wherein a predefined category is associated with each of the plurality of groups of frequency bands, wherein each predefined category is indicative for an available quality of service within the associated group of frequency bands, the network unit comprising:
   a determination unit adapted to determine a quality of service being required by the wireless network system,
   a comparison unit adapted to compare the required quality of service with the predefined categories of the plurality of groups of frequency bands,
   a selection unit adapted to select a group of frequency bands based on the comparison, and
   an assignation unit adapted to assign the selected group of frequency bands to the wireless network system for communication between the at least one base station and the at least one user equipment.

12. A wireless network system, the wireless network system comprising:
   at least one base station;
   at least one user equipment; and
   a network unit comprising:
      a determination unit adapted to determine a quality of service being required by the wireless network system;
      a comparison unit adapted to compare the required quality of service with predefined categories of a plurality of groups of frequency bands;
      a selection unit adapted to select a group of frequency bands based on the comparison; and
      an assignation unit adapted to assign the selected group of frequency bands to the wireless network system for communication between the at least one base station and the at least one user equipment.

13. The system as set forth in claim 12, wherein the network unit is further configured to:
    determine a quality of service being required by a further wireless network system;
    compare the required quality of service with the pre-defined categories of the plurality of groups of frequency bands;
    select a group of frequency bands based on the comparison; and
    assign at least one band of the selected group of frequency bands to the wireless network system, for communication between at least one further base station and at least one further user equipment.

14. The system as set forth in claim 12, wherein wireless network systems requiring a similar quality of service are assigned to a similar category of group of frequency bands.

15. The system as set forth in claim 12, wherein a group of frequency bands comprises at least one frequency band.

16. The system as set forth in claim 12, wherein the network unit is further configured to:
    determine an available quality of service for each of the plurality of frequency bands;
    partition the plurality of frequency bands into a plurality of groups of frequency bands based on the determined quality of service; and
    associate a category with each of the plurality of groups of frequency bands, wherein a category is indicative for an available quality of service within the associated group of frequency bands.

17. The network unit as set forth in claim 11, the network unit being further configured to:
    adapt the category for each of the plurality of groups of frequency bands by:
        adapting the quality of service for each of the plurality of frequency bands; and
        re-partitioning the plurality of frequency bands into a plurality of groups of frequency bands based on the adapted quality of service.

18. The network unit as set forth in claim 11, the network unit being further configured to:
    detect an actual load of the plurality of groups of frequency bands; and
    select a group of frequency bands based on the comparison and the actual load.

19. The network unit as set forth in claim 11, the network unit being further configured to exchange a signal between the wireless network system and a further wireless network system, wherein the signal comprises information of the plurality of groups and the category associated with each group.

20. The network unit as set forth in claim 11, wherein the plurality of groups and the category associated with each group is stored in a central control unit.

* * * * *